United States Patent
Warren et al.

[11] Patent Number: 6,073,897
[45] Date of Patent: Jun. 13, 2000

[54] THREE DEGREE OF FREEDOM CLAMP

[75] Inventors: Peter Warren, Ottawa, Canada; David Conroy, Brooklyn, N.Y.

[73] Assignee: Lowel-Light Manufacturing, Inc., New York, N.Y.

[21] Appl. No.: 09/274,176

[22] Filed: Mar. 23, 1999

[51] Int. Cl.[7] .................................................. E04G 3/00
[52] U.S. Cl. ........................................ 248/278.1; 248/313
[58] Field of Search .............................. 248/278.1, 276.1, 248/274.1, 313, 316.1, 316.5, 229.13, 229.23

[56] References Cited

U.S. PATENT DOCUMENTS

| | | | |
|---|---|---|---|
| 4,850,804 | 7/1989 | Huang | 248/278.1 X |
| 4,887,784 | 12/1989 | Kayali | 248/248.1 X |
| 5,573,329 | 11/1996 | Van Gennep | 248/229.13 X |
| 5,853,158 | 12/1998 | Riggle | 248/278.1 X |
| 5,863,021 | 1/1999 | Nichols | 248/316.5 X |

*Primary Examiner*—Ramon O. Ramirez
*Attorney, Agent, or Firm*—Notaro & Michalos P.C.

[57] ABSTRACT

A clamp assembly can support a member, in particular a light fixture or light filtering, blocking of reflecting member, on a support such as a stand, table top, shelf or the like, and permit three degrees of freedom between the member and the support. The assembly includes a first clamp arm having a mating side and an attachment side opposite from the mating side and a second clamp arm having a mating side and an opposite attachment side. A pivot journal connects the first and second arms to each other with the mating sides facing each other for rotation of the first clamp arm with respect to the second clamp arm about a first axis extending through the mating sides and journal. A hand crank or screw fixes a relative rotational position between the first and second clamp arms with respect to the first axis. A clamp is connected to the attachment side of the first clamp arm for connecting the first clamp arm to a support or member, the clamp being rotatably connected to the first clamp for rotation about a second axis which is at a non-zero angle to the first axis. A holding mechanism at the attachment side of the second clamp connects the second clamp arm to a member or support. The holding mechanism permits rotation about a third axis which is at a non-zero angle to the first axis so that the clamp and the holding mechanism permit relative positioning of the support and the member with three degrees of freedom.

9 Claims, 4 Drawing Sheets

THREE DEGREE OF FREEDOM CLAMP

FIELD AND BACKGROUND OF THE INVENTION

The present invention relates in general to clamps, and in particular to a new and useful clamp particularly suited for helping support lighting and other equipment used in the fields of photography, videography, imaging, motion pictures, theater and similar environments.

In the field of photography specifically and lighting in general, it is known to use various stands, tripods or even convenient surfaces such as table top edges, doors and other supports to hold and/or elevate lighting and photographic equipment or members such as reflectors, scrims, filters and the like, to appropriate positions. An enormous variety of clamps are known which can be used to hold lighting and other fixtures to the edges of furniture and doors, or to tripods or stands.

Despite the variety of available equipment, a need remains for a versatile clamp which permits a user to move the piece of equipment being supported about at least three orthogonal axises.

SUMMARY OF THE INVENTION

An object of the present invention is to provide a clamp assembly for supporting a member, in particular a light effecting member, on a support and permitting three degrees of freedom between the member and the support, the assembly comprising: a first clamp arm having a mating side and an attachment side opposite from the mating side; a second clamp arm having a mating side and an opposite attachment side; a pivot journal connecting the first and second arms to each other with the mating sides facing each other for allowing rotation of the first clamp arm with respect to the second clamp arm about a first axis extending through the mating sides and journal; first fixing means for fixing a relative rotational position between the first and second clamp arms with respect to the first axis; a clamp connected to the attachment side of the first clamp arm for connecting the first clamp arm to a support or member, the clamp being rotatably connected to the first clamp for rotation about a second axis which is at a non-zero angle to the first axis; and holding means at the attachment side of the second clamp for connecting the second clamp arm to a member or support, the holding means permitting rotation about a third axis which is at a non-zero angle to the first axis; so that the clamp and the holding means permit relative positioning of the support and the member with three degrees of freedom.

A further object of the present invention is to provide such a clamp assembly wherein each of the first and second clamps comprise a passage through the respective first and second clamp arms, the passages containing the second and third axes which are each substantially transverse to the first axis.

A still further object of the present invention is to provide such a clamp assembly including a clip forming said clamp and having a pair of spring-loading clip arms and a stud connected to one of the clip arms, the stud being shaped to be received in one of the first and second clamps, the clip arms being adapted to engage either a support or member.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
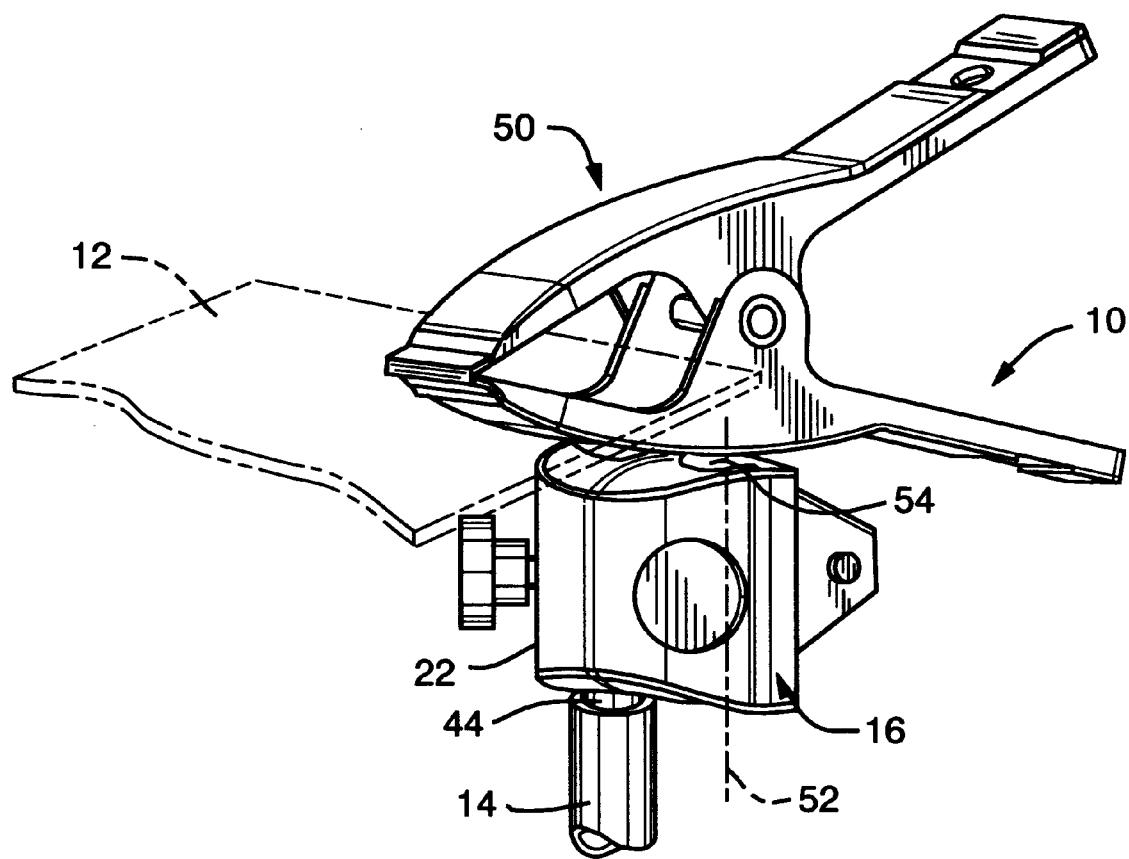
FIG. 1 is a perspective view of a clamp assembly of the present invention.
Figure 2:
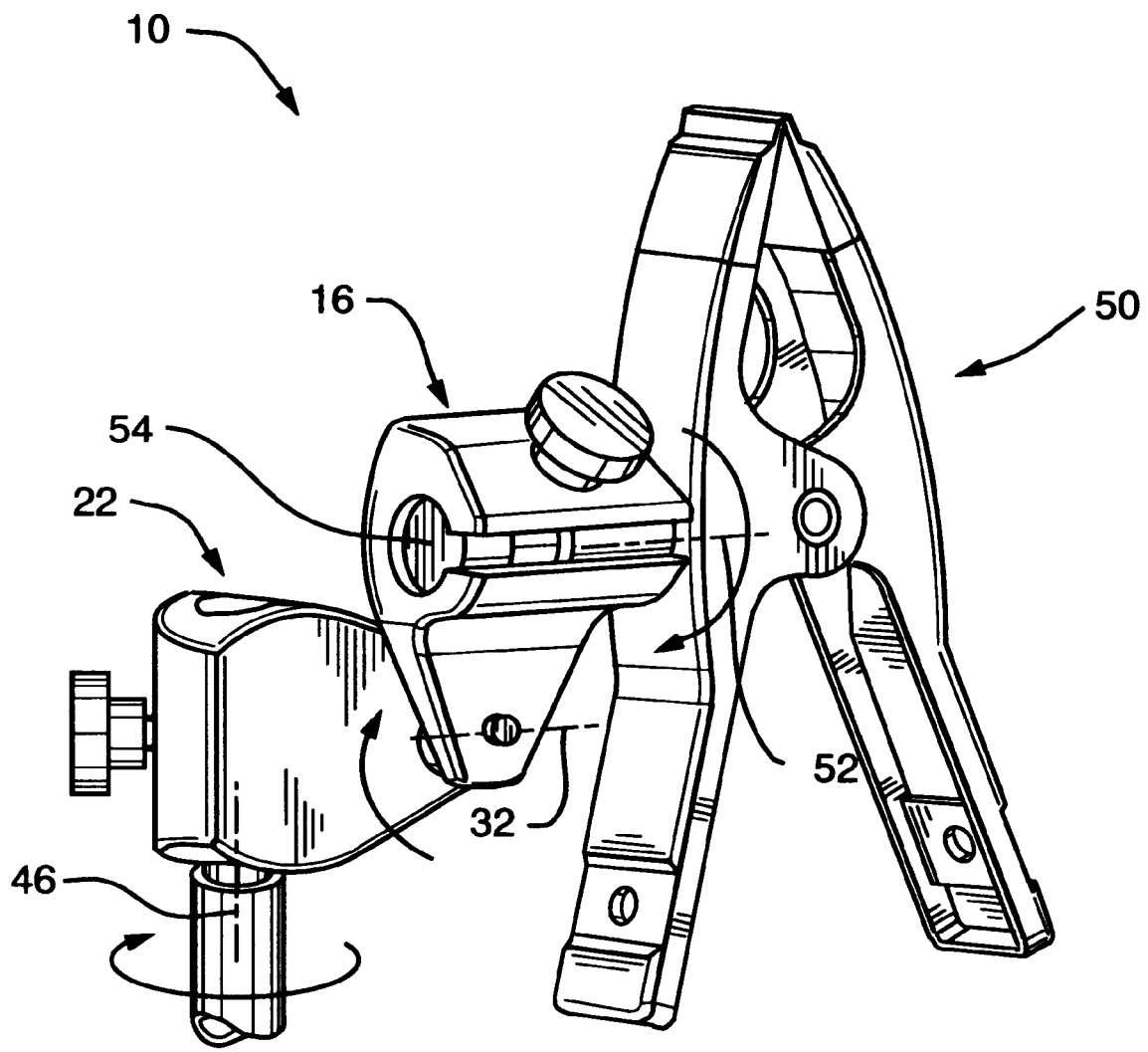
FIG. 2 is a view similar to FIG. 1 with one clamp arm in a different position.

Referring to the drawings in which like reference numerals are used to refer to the same or similar elements, the invention embodied therein is a clamp assembly 10 for supporting a member such as a light filter 12, on a support such as a stand 14, and permitting three degrees of freedom between the member and the support.

For the purpose of this disclosure, the word "support" is meant to include not only stands, but also tripods and other specially designed pieces of equipment for holding lighting fixtures and other light effecting members such as scrims, filters, reflectors and refractors, and shelves, tabletops, structural elements and any other fixed solid member that can be used as a support. Likewise, the term "member" is meant to include not only light fixtures, but also light effecting structures such as scrims, filters, reflectors and the like. In addition, it is understood that according to the present invention the position of the support and the member can be exchanged for convenience and, depending on the ease of engaging the support or member, with an appropriate part of the clamping assembly of the present invention.

Figure 4:
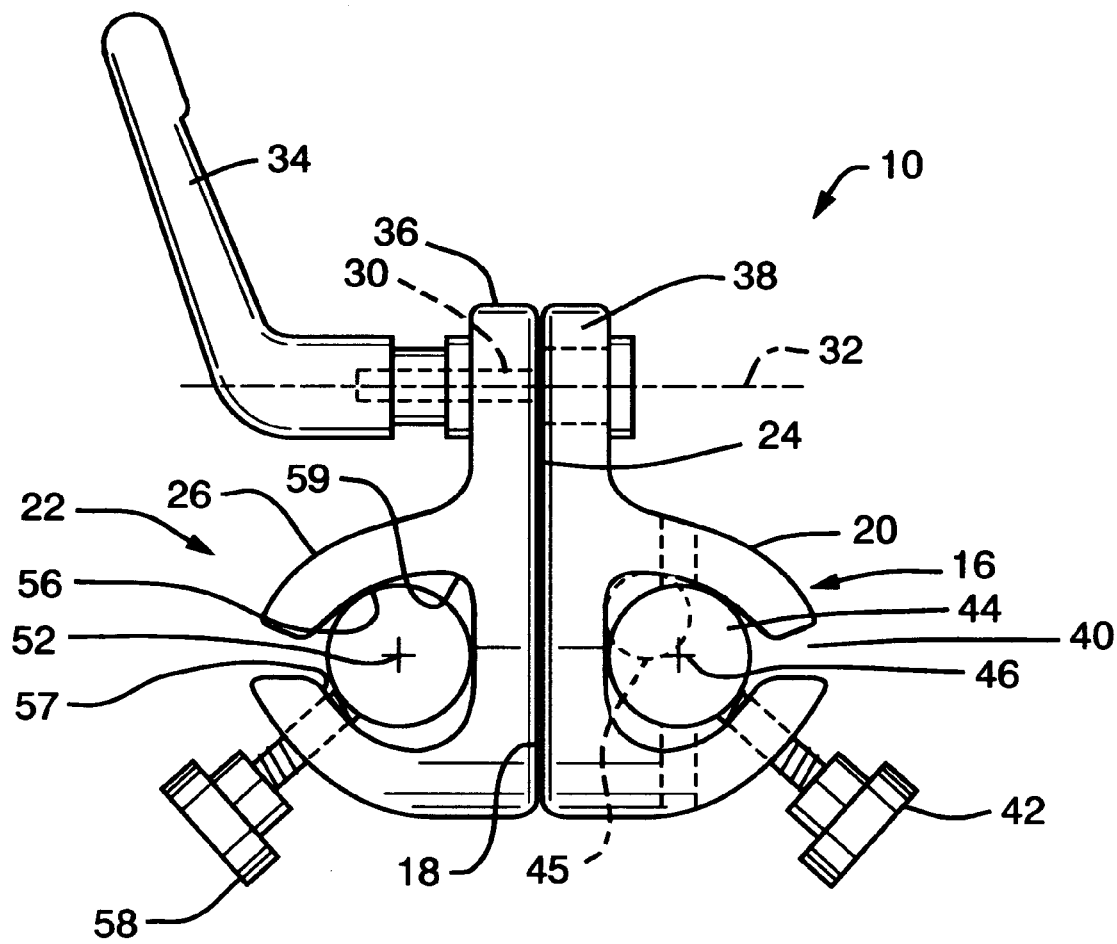
FIG. 4 is a top plan view of the mated clamp arms of the assembly.

The assembly, as shown in FIGS. 1 and 4, comprises a first clamp arm 16 having a mating side 18 which is preferably planar, and an attachment side 20 opposite from the mating side. A second clamp arm 22 having a mating side 24 and an opposite attachment side 26, is connected at a pivot journal 30 between the first and second arms so that their flat mating sides face each other for allowing rotation of the first clamp arm with respect to the second clamp arm about a first axis 32 extending through the mating sides and the journal.

First fixing means for fixing a relative rotational position between the first and second clamp arms with respect to the first axis is provided, for example, by a threaded handle 34, threaded to the threaded part of journal 30 which extends beyond a pivot portion 36 of arm 22. The other end of journal 30 is fixed to pivot portion 38 of arm 16. A clamp in the form of recess 40 and hand screw 42 is connected to the attachment side of the first clamp arm 16 for connecting the first clamp arm to a support or member, such as the stud 44 of stand 14 (FIG. 1). The clamp is rotatably connected to the first clamp arm for rotation about a second axis 46 which is at a non-zero angle to the first axis 32. Holding means, such as clip 50, is at the attachment side 26 of the second clamp arm 22 for connecting the second clamp arm to a member or support. The holding means permits rotation about a third axis 52 which is at a non-zero angle to the first axis 32, so that the clamp and the holding means permit relative positioning of the support and the member with three degrees of freedom.

Figure 3:
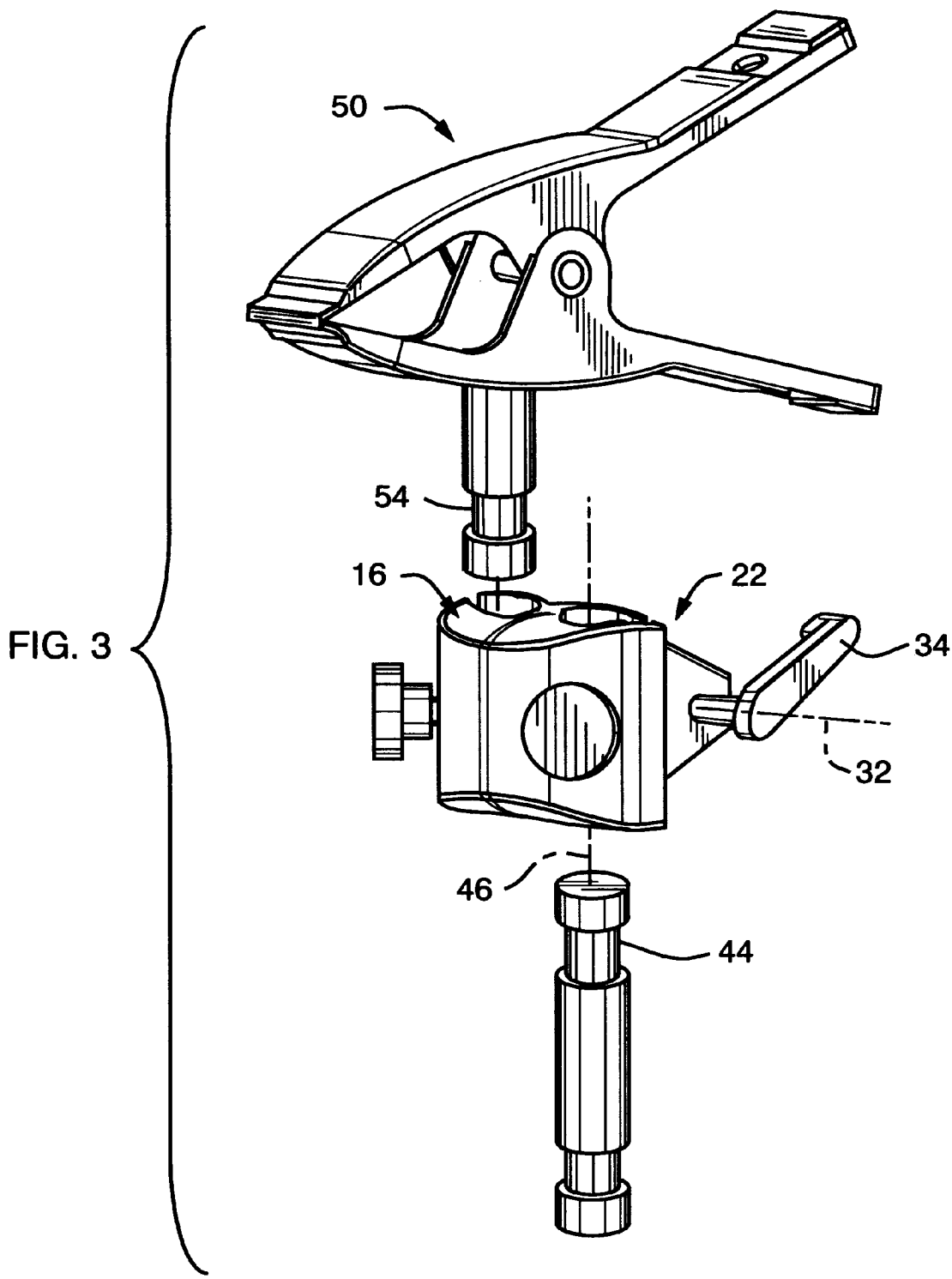
FIG. 3 is an exploded perspective view of the clamp assembly of FIG. 1.

Clip 50 advantageously includes a stud 54 which extends into a recess 56 at the attachment side 26 of second clamp arm 22, and can be held by a second hand screw 58 in any rotational position about the third axis 52. In likewise fashion, hand screw 42 can be loosened to allow relative rotation between the clamp assembly 10 and the stand or stand stud 44. Since the first axis 32 is spaced laterally away from the second and third axis 46,52, the three degrees of freedom are entirely independent of each other and can be varied to allow free positioning between the member being held in clip 50, and the support, such as stand 14. The positions can be reversed in that the clip 50 can be used to hold on to a shelf or other support structure and stud 44 (FIG. 3), used to attach other lighting equipment or fixtures.

A wide selection of such fixtures is available, for example, from Lowel-Light Manufacturing, Inc. of Brooklyn, N.Y.

Clip 50 is spring loaded and has two arms with stud 54 being fixed to one of the arms.

FIG. 4 also shows how each recess 40 and 56 has a semi-cylindrical large diameter portion 57 at the hand screw side of the recess, and an opposite small diameter V-shaped portion 59. This allows studs having a diameter as large as that of portion 57 to be firmly held without rocking in the recess, and also allows small diameter studs, like a stud 45 in recess 40, to be also held firmly without rocking in each recess.

While a specific embodiment of the invention has been shown and described in detail to illustrate the application of the principles of the invention, it will be understood that the invention may be embodied otherwise without departing from such principles.

What is claimed is:

1. A clamp assembly for supporting a member, in particular a light effecting member, on a support and permitting three degrees of freedom between the member and the support, the assembly comprising:

a first clamp arm having a mating side and an attachment side opposite from the mating side;

a second clamp arm having a mating side and an opposite attachment side;

a pivot journal connecting the first and second arms to each other with the mating sides facing each other for allowing rotation of the first clamp arm with respect to the second clamp arm about a first axis extending through the mating sides and journal;

first fixing means for fixing a relative rotational position between the first and second clamp arms with respect to the first axis;

a clamp connected to the attachment side of the first clamp arm for connecting the first clamp arm to a support or member, the clamp being rotatably connected to the first clamp for rotation about a second axis which is at a non-zero angle to the first axis; and holding means at the attachment side of the second clamp arm for connecting the second clamp arm to a member or support, the holding means permitting rotation about a third axis which is at a non-zero angle to the first axis so that the clamp and the holding means permit relative positioning of the support and the member with three degrees of freedom.

2. A clamp assembly according to claim 1 wherein the first and second clamp arms each contain a recess extending along the second and third axis, respectively, the holding means including a clip with a stud and screw means for holding the stud in the recess of the second clamp arm.

3. A clamp assembly according to claim 1 wherein the holding means comprises a clip connected to the attachment side of the second clamp arm and means for holding the clip at a selected rotational position about the third axis to the second clamp arm.

4. A clamp assembly according to claim 1 wherein the mating sides both include planar portions which are slidably mounted to each other, the pivot journal being spaced away from the second and third axis.

5. A clamp assembly according to claim 1 wherein the first and second clamp arms each include a pivot portion, each clamp arm including at its respective attachment side a recess, the clamp being connected to the recess of the first clamp arm and the holding means being connected to the recess of the second clamp arm, the pivot journal extending through the pivot portions and being spaced away from the recesses of the first and second clamp arms.

6. A clamp assembly according to claim 5 wherein said holding means includes a clip having spring-loaded arms and a stud connected to one of said spring-loaded arms, said stud extending into the recess of said second clamp arm.

7. An assembly for supporting a member, in particular a light effecting member, on a support and permitting three degrees of freedom between the member and the support, the assembly comprising:

a first arm having a mating side and an attachment side opposite from the mating side;

a second arm having a mating side and an opposite attachment side;

a pivot journal connecting the first and second arms to each other with the mating sides facing each other for allowing rotation of the first arm with respect to the second arm about a first axis extending through the mating sides and journal;

fixing means for fixing a relative rotational position between the first and second arms with respect to the first axis;

the first and second arms each contain a recess extending along second and third axes, respectively; and screw means for holding a stud in each recess at a selected position with respect to said second and third axes.

8. An assembly according to claim 7 wherein the mating sides both include planar portions which are slidably mounted to each other, the pivot journal being spaced away from the second and third axis.

9. An assembly according to claim 7 wherein the first and second arms each include a pivot portion, the pivot journal extending through the pivot portions and being spaced away from the recesses of the first and second arms.

* * * * *